United States Patent
Reyes

(10) Patent No.: US 8,727,848 B1
(45) Date of Patent: May 20, 2014

(54) COLOR GAME

(76) Inventor: Melvin G Reyes, Bedford, MA (US)

(*) Notice: Subject to any disclaimer, the term of this patent is extended or adjusted under 35 U.S.C. 154(b) by 0 days.

(21) Appl. No.: 13/609,327

(22) Filed: Sep. 11, 2012

Related U.S. Application Data

(60) Provisional application No. 61/572,308, filed on Sep. 12, 2011.

(51) Int. Cl.
*G07F 17/32* (2006.01)

(52) U.S. Cl.
USPC .................................. 463/9; 463/7; 463/46

(58) Field of Classification Search
USPC .............. 463/7, 9, 37; 273/236, 237
See application file for complete search history.

(56) References Cited

U.S. PATENT DOCUMENTS

| 4,207,087 A | 6/1980 | Morrison et al. |
| 7,374,481 B2 * | 5/2008 | Rehkemper et al. ............. 463/9 |
| 7,695,357 B2 | 4/2010 | Fleury et al. |
| 7,997,970 B2 * | 8/2011 | Katz et al. ..................... 463/9 |

* cited by examiner

*Primary Examiner* — Omkar Deodhar
(74) *Attorney, Agent, or Firm* — Altman & Martin; Steven K Martin

(57) ABSTRACT

A game with a housing with a number of colored buttons on the top. Each button has an outer color and small circle in the center of an inner color. The game announces a color randomly from the set of inner colors. The player must press the button with the inner circle of the announced color with a short interval. As buttons are correctly pressed, the game continues to announce random colors. As the game progresses, the time within which the correct button must be pressed decreases. If the wrong button is pressed or the interval expires, the game is terminated and the number of correct presses is announced.

7 Claims, 4 Drawing Sheets

COLOR GAME

CROSS-REFERENCES TO RELATED APPLICATIONS

The present application claims the benefit of and priority to U.S. Provisional Patent Application No. 61/572,308, filed on Sep. 12, 2011 for COLOR RUSH in the name of Melvin G. Reyes, and is hereby incorporated by reference in its entirety.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to games, more particularly, to a game using a combination of colors and speed.

2. Description of the Related Art

There are many board and electronic games that teach children and there are many that teach color. However, there are none that teach colors and that also teach coordination, mental agility and is fast-paced.

BRIEF SUMMARY OF THE INVENTION

The game of the present invention has a housing with a number of colored buttons on the top. Each button has an outer color and small circle in the center of an inner color. The game announces a random color (for example, "blue") from the set of inner colors. The player has a short time to press the button with the inner circle of the announced color. As buttons are correctly pressed, the game continues to announce random colors. As the game progresses, the speed increases, that is, the time within which the correct button must be pressed decreases.

A housing contains all of the components of the game in a desk-top version or hand-held version with a handle. Within the housing is a circuit board with a processor that controls the operation of the game. Accessible from the outside of the housing are a number of switches, including a playing level button, a start/stop button, and the color buttons. The processor controls one or more audio output devices, such as a speaker and/or headphones.

There can be any number of color buttons and can be any shape desired. The cap of each color button has a circle of an inner color surrounded by a ring of an outer color. The inner color and outer color can be very different, high-contrast colors, for an easier game or they can be similar, low-contrast colors, such as blue and violet, for a more difficult game. Optionally, the buttons have removable caps so that the color combinations of the buttons can be changed. Optionally, the buttons have internal lighting so that the colors of the buttons can be changed programmatically.

A program running on the processor controls the operation of the game. When power is applied, the playing level is set. The playing level determines the press interval within which the player must push the correct color button after the color is announced. The present invention contemplates that the press interval is on the order of 1-2 seconds or shorter.

After initialization, the program waits for a button to be pressed. If the playing level button is pressed, the playing level increments to the next higher level. If the playing level is already at the highest level, it is reset to the lowest level. If the start/stop button is pressed, the counter of the number of correct color buttons pressed is set to zero and the game begins.

The program chooses a color randomly from the set of inner colors and announces it via the speaker. A timer is set to the press interval and started. Then the program waits for either a button to be pressed or the timer to expire.

If the timer expired or the incorrect color button is pressed, an announcement that the game is over and the number of correct color button presses is made.

If the correct color button is pressed, the correct button counter is incremented. If the correct button counter has not reached the number of correct color button presses for the level, the program returns to randomly select and announce a color. If the counter has reached the number of correct color button presses for the level and the game is not on the highest level, the play level is increased and the program returns to reset the counter. If the counter has reached the number of correct color button presses for the level and the game is on the highest level, an announcement that the game is over and the number of correct color button presses that were made.

In another embodiment, there is a large multicolor button. In another embodiment, there is a large white button with a multicolor circle and a large multicolor button with a white circle.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

The present invention is a fast-paced, color learning game that entertains and educates children of all ages. It helps to develop mental agility and is a great way to entertain people of all ages. It stimulates hearing, vision, and touch, and also can sharpen reaction time.

In summary, the game of the present invention calls out a random color (for example, "blue"). The player will have a short time, typically not more than two seconds, to press the corresponding color button, the button with the blue circle on it. Each color button is outlined by a different color (for example, yellow) in order to confuse the player. The point of the game is to quickly press the color button corresponding to the color called out within the allotted time. The game continues to call out random colors. Optionally, as the game progresses, the speed increases, that is, the time within which the correct button must be pressed decreases.

The game 10 of the present invention is housed in a housing 12 that contains all of the components of the game 10. As shown in the desk-top version of FIG. 1, the housing 12 has an upper surface 14 that is large enough to comfortably hold at least the color buttons 28, as described below. The housing 12 is typically composed of a high-impact plastic, but can be composed of other materials with the appropriate characteristics. Typically, the housing 12 has a bottom and a top that either snap together or are otherwise attached, such as by screws, rivets, or adhesive.

Figure 3:
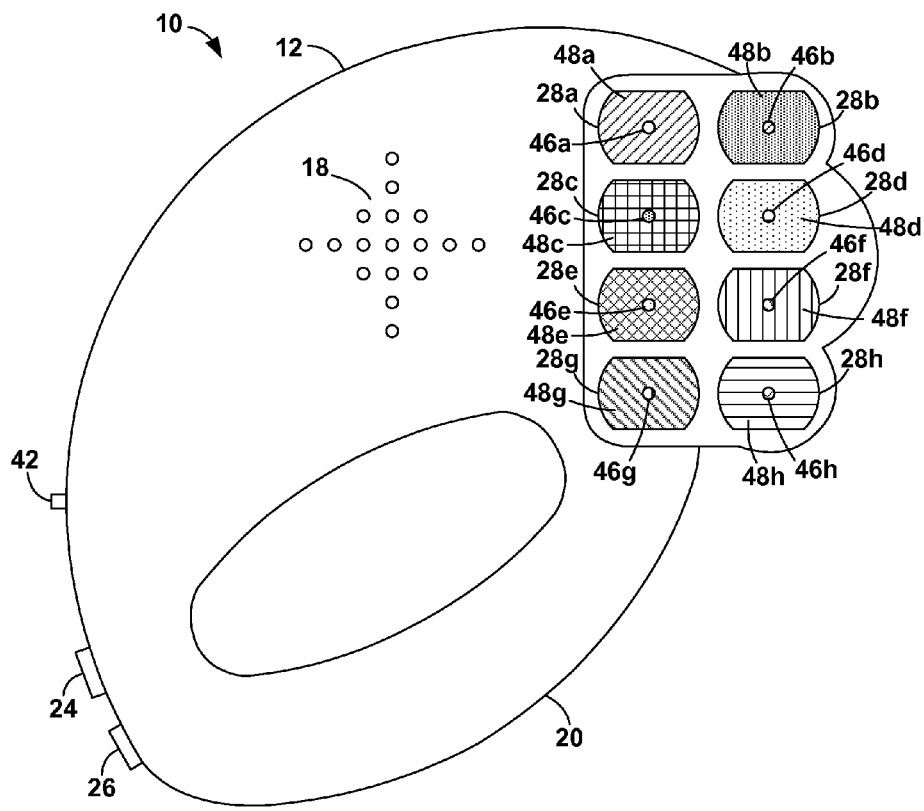
FIG. 3 is a top view of an embodiment of the game of the present invention with a hand-held housing.

A hand-held housing 12 for the game of the present invention is shown in FIG. 3. The housing 12 has a handle 20 for comfortably holding the housing 12 during game play.

Mounted within the housing 12 is a circuit board that includes a processor 22 that controls the operation of the game 10.

Figure 4:
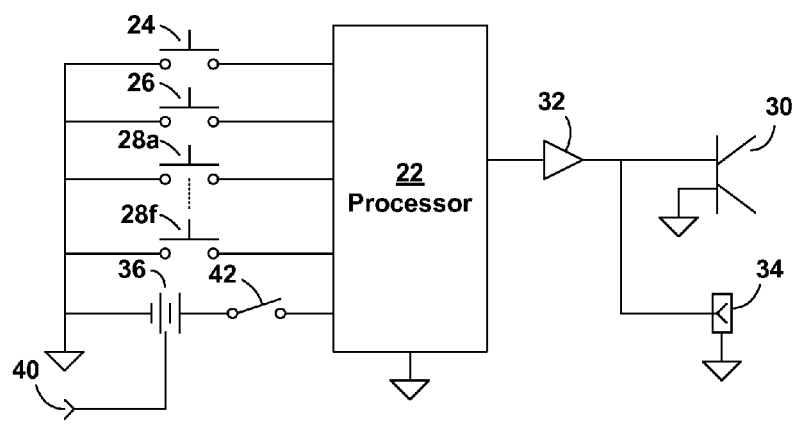
FIG. 4 is an electrical schematic diagram of the game of FIG. 1.

A basic circuit diagram of the game 10 of the present invention is shown in FIG. 4. It has the processor 22 which includes its attendant clock, memory, input/output devices, etc. A number of switches are inputs to the processor 22, including a playing level button 24, a start/stop button 26, and color buttons 28a, 28b, 28c, 28d, 28e, 28f (collectively, 28).

The playing level button 24 can be a momentary-contact push button, as in FIG. 4. Alternatively, the playing level switch is a multi-position switch that has a position for each playing level. The playing level button 24 typically be located on the side of the housing 12.

The start/stop button 26 is a momentary-contact push button, as in FIG. 4. The start/stop button 26 typically be located on the side of the housing 12.

Figure 1:
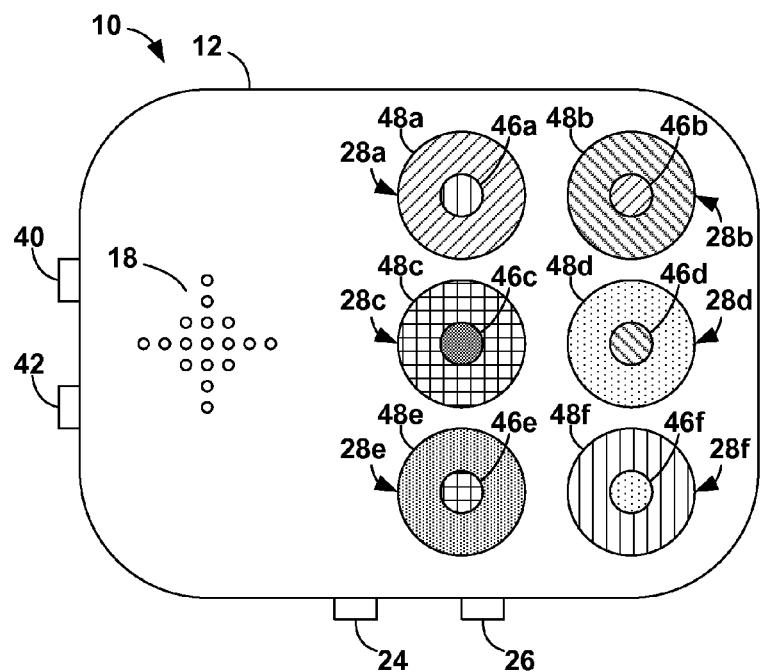
FIG. 1 is a top view of an embodiment of the game of the present invention with a desk-top housing.

The color buttons 28 are momentary-contact push buttons, as in FIG. 4. The color buttons 28 are located on the top of the housing 12. There can be any number of color buttons 28 and can be any shape desired. In FIG. 1, there are six round buttons 28. In FIG. 3, there are eight flattened oval buttons 28. The flat sides of the buttons 28 of FIG. 3 permit them to be positioned closer together. Unless indicated otherwise, the remainder of the present specification uses the six round buttons 28 of FIG. 1 as an example.

The cap of each color button 28 has a circle 46a, 46b, 46c, 46d, 46e, 46f (collectively, 46) of an inner color surrounded by a ring 48a, 48b, 48c, 48d, 48e, 48f (collectively, 48) of an outer color. The circle shape for the inner color is preferred but can be any shape. The shape of the ring 48 is dictated by the shape of the button 28, that is, the outer perimeter of the ring 48 is the same as that of the button 28. In the buttons 28 of FIG. 1, the ring 48 is round. In the buttons 28 of FIG. 3, the ring 48 is a flattened oval. The inner color and outer color can be very different, high-contrast colors, such as yellow and red, thereby making the game easier, or they can be similar, low-contrast colors, such as blue and violet, thereby making the game more difficult.

The color buttons 28 can all have unique color combinations or some color combinations can be duplicated and the locations of the color combinations can vary. The combination of inner colors is referred to as the set of inner colors.

The background color, that is, the color of the housing top surface 14, should be chosen so that the outer color is clearly distinguishable. In the present configuration, the background color is white.

The diameter of the circle 46 depends on who the particular game is designed for. Assuming that the diameter of the ring 48 is constant, the larger the circle 46, the easier the game is. Conversely, the smaller the circle 46, the more difficult the game is. The present invention contemplates that the ring 48 can have a diameter in the range of from approximately ¾ inch to approximately 2 inches and the circle 46 can have a diameter in the range of from approximately ¹⁄₁₆ inch to approximately ½ inch. In the configuration of FIG. 1, the ring 48 is 1 inch in diameter and the circle 46 is ³⁄₁₆ inches in diameter. In the configuration of FIG. 3, the ring 48 is 2 inches long and 1 inch wide. The present invention also contemplates that the circle 46 and ring 48 of each color button 28 can have different diameters from those of the other color buttons 28.

Optionally, the buttons 28 have removable caps so that the color combinations of the buttons 28 can be changed. The caps can be removed and reinstalled on different buttons 28.

Optionally, the buttons 28 have internal colored lighting so that the colors of the buttons can be changed programmatically.

The processor 22 controls one or more audio output devices 30, such as a speaker and/or headphones, through an audio output device driver 32. In one configuration, there is only a speaker that is mounted to the underside of the top surface 14 of the housing 12 and is audible through a grille 18 in the top surface 14. In another configuration there is both a speaker and a headphone jack 34 into which headphones can be plugged. Depending on the particular design, when the headphone jack 34 is in use, the speaker 30 can be either remain on or be shut off. In a third configuration, there is no speaker 30, only a headphone jack 34 for headphones.

Figure 2:
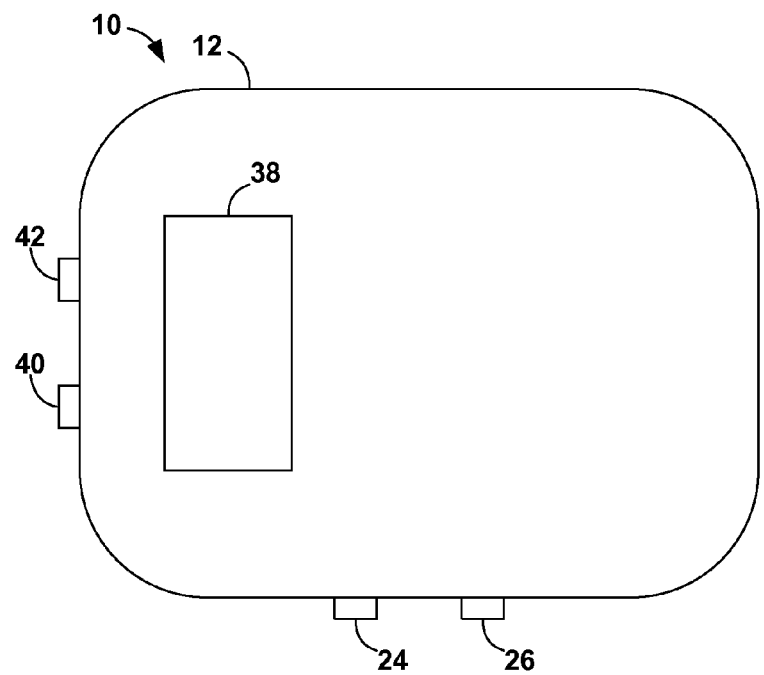
FIG. 2 is a bottom view of the housing of FIG. 1.

Power is supplied to the processor 22 by an internal battery 36. In one form, the battery 36 is replaceable through a hatch 38 in the bottom 16 of the housing 12, as in FIG. 2. In another form, the battery 36 is rechargeable. If so, the appropriate recharging power is supplied through a socket 40. Optionally, the rechargeable battery 36 is replaceable through a battery hatch 38.

A power switch 42 turns the game 10 on and off, typically by electrically connecting and disconnecting the battery 36 from the processor 22.

Figure 5:
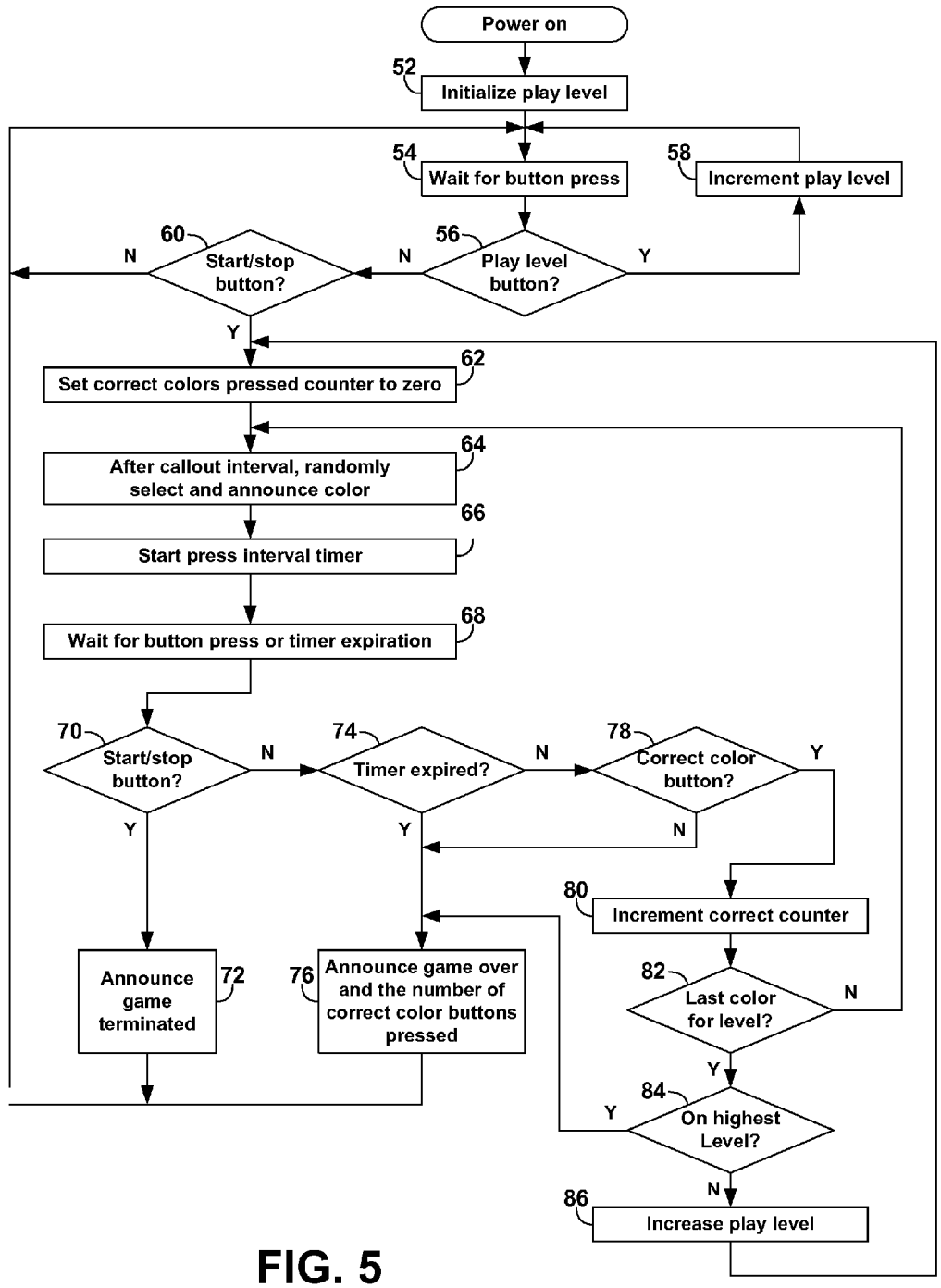
FIG. 5 is a flow diagram of the program for the game of the present invention.

A program running on the processor 22 controls the operation of the game 10. A basic flow chart of the program is shown in FIG. 5.

When power is first applied, the program initializes, as at 52. Initialization includes setting the playing level. In one configuration, the playing level is set to the lowest level each time the game is turned on. In another configuration, the playing level is stored in persistent memory when the game is turned off and reloaded when the game is next turned on. Optionally, the current playing level is announced through the speaker 30.

The playing level determines the time interval within which the player must push the correct color button 28 after the color is announced, the press interval. The present invention contemplates that the press interval may be any relatively short amount of time. For example, at the lowest level of play, the press interval can be two seconds, with shorter intervals, such as 1½ seconds, 1 second, ¾ second and ½ second, for higher levels of play. The press intervals can be closer together as the game continues. For example, the press intervals can decrease by 0.1 seconds for each higher level.

In one configuration, the playing level also determines the amount of time between the correct color button press and the next color callout, the callout interval. The callout interval can be the same as the press interval for the same level, or can be different.

In another configuration, the callout interval is constant throughout the game. Optionally, the callout interval can be near zero, where the next color is called out immediately after pressing the correct color.

After the game is powered on, as at 50, and program is initialized, as at 52, it waits for a button to be pressed, as at 54. If the playing level button 24 is pressed, as at 56, the playing level increments to the next higher level, as at 58. If the playing level is already at the highest level, it is reset to the lowest level. If the playing level switch is a multi-position switch, the playing level is set appropriately to the switch position. Optionally, the new level is announced through the speaker 30.

If the start/stop button 26 is pressed, as at 60, the counter of the number of correct color buttons pressed is set to zero, as at 62, and the game begins. Any other button presses are ignored.

After waiting for the callout interval, the program chooses a color randomly and announces it via the speaker 30, as at 64. Colors are chosen from the set of inner colors of the color buttons 28. Therefore, the set of colors from which the color is randomly chosen is determined by the number of different inner colors. In the configuration of FIG. 1, there are six different inner colors. In the configuration of FIG. 3, there are eight different inner colors. However, the present invention contemplates that there can be any number of color buttons 28, thus, any number of inner colors.

Once the color is announced, a timer is set to the press interval of the current play level and started, as at 66. Then the program waits for either a button to be pressed or the timer to expire, as at 68.

If the start/stop button 26 is pressed, as at 70, the termination of the game is announced, as at 72, and the game ends. The program returns to wait for a button press, as at 54.

If the timer expired, as at 74, an announcement that the game is over and the number of correct color button presses that were made, as at 76. The program returns to wait for a button press, as at 54.

If the button pressed is not the correct color, as at 78, an announcement that the game is over and the number of correct color button presses that were made, as at 76. The program returns to wait for a button press, as at 54.

If the button pressed is the correct color, the correct button counter is incremented, as at 80. Optionally, an announcement that the correct button was pressed is made.

The number of colors called for each level can be the same or can vary by level. Typically, if the number varies by level, the number of colors called will decrease with the increase in level so that the game speeds up faster as the level increases. For example, the lowest levels may call out 12 colors, the next higher levels may call out 10 colors, the next higher levels may call out 8 colors, and the highest level may call out 6 colors.

If the correct button counter has not reached the number of correct color button presses for the level, as at 82, the program returns to randomly select and announce a color, as at 64.

If the counter has reached the number of correct color button presses for the level, as at 82, and the game is not on the highest level, as at 84, the play level is increased and the program then returns to reset the counter, as at 62.

If the counter has reached the number of correct color button presses for the level, as at 82, and the game is on the highest level, as at 84, the game is over. An announcement that the game is over and the number of correct color button presses that were made, as at 76. The program returns to wait for a button press, as at 54.

Figure 6:
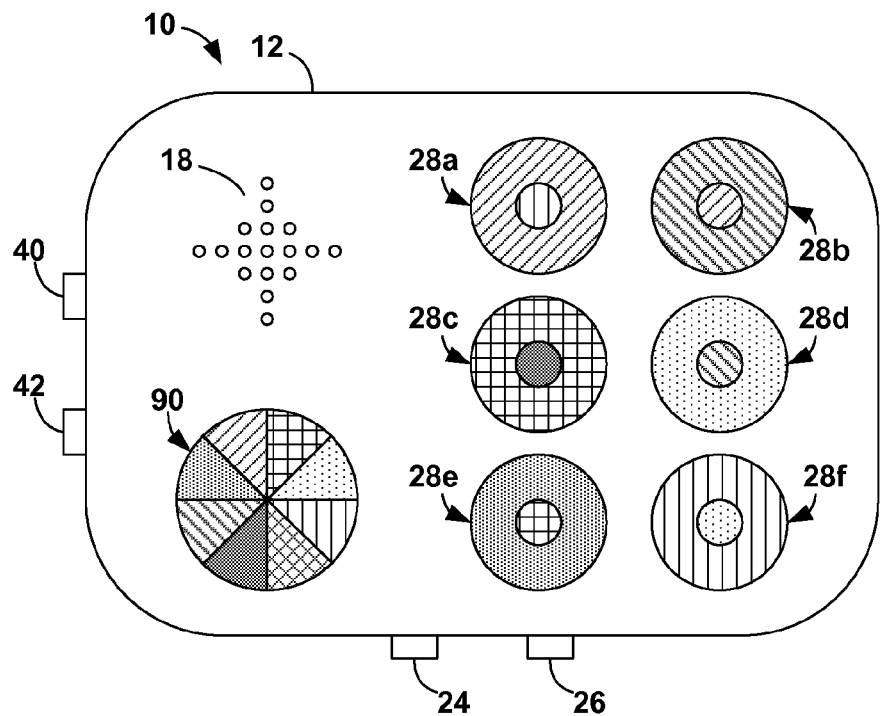
FIG. 6 is a top view of another embodiment of the game of the present invention.
Figure 7:
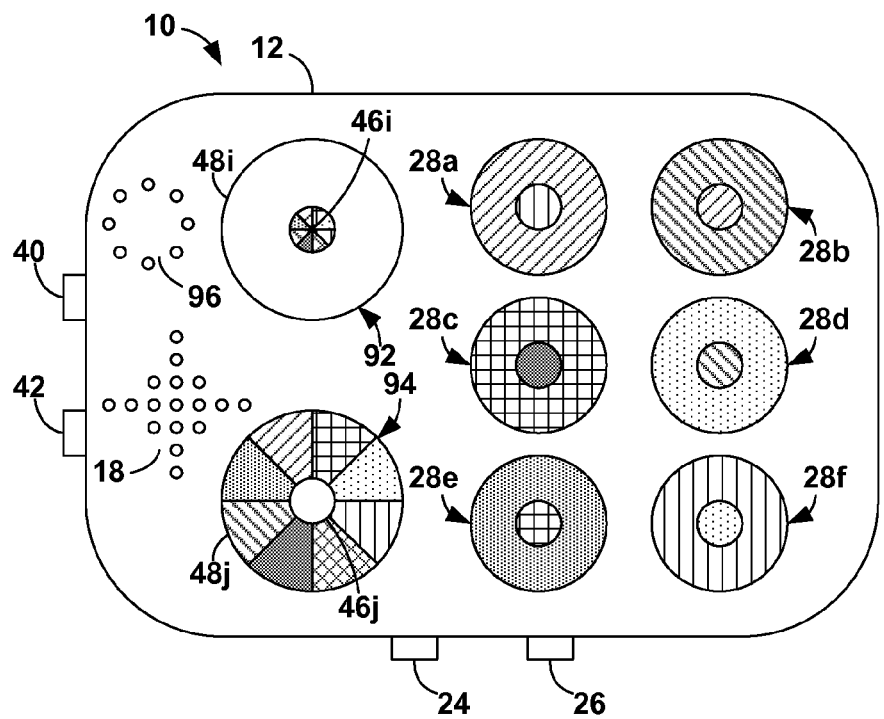
FIG. 7 is a top view of another embodiment of the game of the present invention.

Another embodiment of the present invention is shown in FIG. 5. In addition to the color buttons 28 described above, there is a multicolor button 90. The multicolor button 90 is large with a diameter in the range of from approximately 1½ inches to approximately 2½ inches. The multicolor button 90 has a variety of colors surrounded by the top surface color. The colors may be in any pattern. In FIG. 6, the colors are arranged in a pie pattern. Other arrangements include a rainbow pattern. The set of inner colors from which the random selection is made in 64 of FIG. 5 includes "multicolor". When "multicolor" is announced, the multicolor button 90 must be pressed within the press interval.

Another embodiment of the present invention is shown in FIG. 6. In addition to the color buttons 28 described above, there is a multicolor button 92 and a white button 94. The multicolor button 92 has a multicolor circle 46i and a white ring 48i. The white button 94 has a white circle 46j and a multicolor ring 48j. The buttons 92, 94 are large with a diameter in the range of from approximately 1½ to approximately 2½ inches and the circle 46i, 46j ranges in diameter from approximately ¼ inch to approximately ¾ inch. The colors may be in any pattern. The set of inner colors from which the random selection is made in 64 of FIG. 5 includes "multicolor" and "white". When "multicolor" is announced, the multicolor button 92 must be pressed within the press interval. When "white" is announced, the white button 94 must be pressed within the press interval. Optionally, there is a set small lights 96, such as LEDs, of colors that match the colors from the set of inner colors. The LEDs 96 can be used to either reinforce the announced color, where the LED of the announced color is lit, or to confuse, where an LED that is not the announced color is lit.

The present invention contemplates several optional enhancements. A button can be added to set the number of players and the game over announcement at 76 can include the player number. A display can show the scores for each player. Announcements can be more elaborate and include music or other sound effects.

Thus it has been shown and described a color game. Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A game having more than one playing level, said game comprising:
   (a) a housing having an upper surface;
   (b) a plurality of color buttons on said upper surface of said housing, each of said buttons having an outer color and an inner color from a set of inner colors;
   (c) an audio output device;
   (d) processing circuitry in said housing connected to carry out a game program, including receiving presses of said color buttons and generating sounds for said audio output device;
   (e) said game program containing instructions for carrying out a game method comprising the steps of:
   (1) randomly selecting a color from the set of inner colors as an announced color;
   (2) announcing said announced color on said audio output device;
   (3) setting a timer to a predetermined interval depending on a current playing level;
   (4) waiting until either said timer expires or a color button is pressed;
   (5) if said timer expires, terminating said game;

(6) if said pressed color button has an inner color that is not the same as said announced color, terminating said game;

(7) if said pressed color button has an inner color that is the same as said announced color, determining if the pressed color button is the last for said current playing level;

(8) if said pressed color button is the last for said current playing level and there are no more playing levels, terminating said game;

(9) if said pressed color button is the last for said current playing level and there is at least one more playing level, change said current playing level and return to randomly selecting an announced color.

2. The game of claim 1 further comprising a level button, said processing circuitry receiving presses of said level button, and said program changing said playing level upon receiving a press from said level button.

3. The game of claim 1 further comprising a start/stop button, said processing circuitry receiving presses of said start/stop button, and said program waiting for a press of said start/stop button before randomly selecting said announced color for the first time.

4. The game of claim 1 wherein said housing has a handle for holding said game while playing.

5. The game of claim 1 wherein said inner color is in a circle.

6. The game of claim 1 wherein said instructions further comprise, when said game is terminated, announcing why the game terminated.

7. The game of claim 1 wherein said outer color is different from said inner color on each of said color buttons.

\* \* \* \* \*